(12) United States Patent
Zhai (10) Patent No.: US 11,889,921 B2
(45) Date of Patent: Feb. 6, 2024

(54) SUPPORT APPARATUS AND ELECTRONIC DEVICE

(71) Applicant: Lenovo (Beijing) Limited, Beijing (CN)

(72) Inventor: Xiaoxing Zhai, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 17/474,813

(22) Filed: Sep. 14, 2021

(65) Prior Publication Data

US 2022/0133039 A1 May 5, 2022

(30) Foreign Application Priority Data

Oct. 30, 2020 (CN) .......................... 202011197494.9

(51) Int. Cl.
*A47B 97/04* (2006.01)
*A47B 97/00* (2006.01)
*F16M 11/20* (2006.01)
*G06F 1/16* (2006.01)

(52) U.S. Cl.
CPC .......... *A47B 97/00* (2013.01); *F16M 11/2021* (2013.01); *G06F 1/1622* (2013.01); *A47B 97/04* (2013.01); *A47B 2097/006* (2013.01); *F16M 2200/021* (2013.01)

(58) Field of Classification Search
CPC ....... A47B 23/00; A47B 23/04; A47B 23/043; A47B 23/044; A47B 97/04; A47B 97/08
USPC .... 248/441.1, 444, 447, 448, 449, 454, 455, 248/457, 458, 460, 462
See application file for complete search history.

(56) References Cited

U.S. PATENT DOCUMENTS

| | | | | | |
|---|---|---|---|---|---|
| 4,544,123 | A | * | 10/1985 | Peacock ................. | A47B 19/08 206/45.24 |
| 5,884,889 | A | * | 3/1999 | Crosby ................ | A47B 23/044 248/444 |
| 6,213,439 | B1 | * | 4/2001 | Giulie .................... | A47B 97/04 248/459 |
| 7,334,768 | B1 | * | 2/2008 | Lum ...................... | A47B 23/04 248/444 |
| 9,668,571 | B1 | * | 6/2017 | Ghobadi ................ | A47B 21/02 |
| 10,664,012 | B1 | * | 5/2020 | Zimmerman ........... | H04M 1/04 |
| 11,167,583 | B1 | * | 11/2021 | Jarzombek ................ | B42F 7/06 |
| 2009/0289166 | A1 | * | 11/2009 | Hopfer ................. | A47B 23/043 248/456 |
| 2011/0025006 | A1 | * | 2/2011 | Knoppers .............. | A47B 31/00 292/8 |
| 2018/0132636 | A1 | * | 5/2018 | Chen .................... | A47B 23/043 |

* cited by examiner

*Primary Examiner* — Alfred J Wujciak
(74) *Attorney, Agent, or Firm* — ANOVA LAW GROUP, PLLC (57) ABSTRACT

A support apparatus includes: a first support member; a second support member rotatably connected to the first support member and capable of rotating within a first angle range starting from a position where the first support member is located; and a third support member rotatably connected to the second support member and capable of, after the second support member rotates to a maximum angle thereof, continuing to rotate in a direction in which the second support member rotates within a second angle range starting from a position where the second support member is located. The second angle range is greater than or equal to the first angle range.

18 Claims, 3 Drawing Sheets

SUPPORT APPARATUS AND ELECTRONIC DEVICE

CROSS-REFERENCE TO RELATED APPLICATION

This application claims priorities to Chinese Patent Application No. 202011197494.9 filed on Oct. 30, 2020, the entire content of which is incorporated herein by reference.

TECHNICAL FIELD

The present disclosure relates to the technical field of support structures of electronic equipment and, more particularly, to a support apparatus and an electronic device.

BACKGROUND

At present, many electronic devices tend to have a flat panel or tablet design that is compact and thin, making them convenient for users to carry. However, such design also creates inconvenience for the users to operate the electronic devices. Because the tablet electronic devices use screens for both input and output and do not have any standing structures, the users often hand hold this type of electronic devices or place them on desktops when watching videos or writing on the screens. Hand holding the electronic devices for an extended amount of time causes arm soreness and numbness or other discomfort of the users. Placing the electronic devices on the desktops keeps the users in a bowing posture for the extended amount of time. As a result, the users may suffer from neck and shoulder pain, and even dizziness.

SUMMARY

One aspect of the present disclosure includes a support apparatus. The support apparatus includes: a first support member; a second support member rotatably connected to the first support member and capable of rotating within a first angle range starting from a position where the first support member is located; and a third support member rotatably connected to the second support member and capable of, after the second support member rotates to a maximum angle thereof, continuing to rotate in a direction in which the second support member rotates within a second angle range starting from a position where the second support member is located. The second angle range is greater than or equal to the first angle range.

Another aspect of the present disclosure includes an electronic device. The electronic device includes a support apparatus. The support apparatus includes: a first support member; a second support member rotatably connected to the first support member and capable of rotating within a first angle range starting from a position where the first support member is located; and a third support member rotatably connected to the second support member and capable of, after the second support member rotates to a maximum angle thereof, continuing to rotate in a direction in which the second support member rotates within a second angle range starting from a position where the second support member is located. Tthe second angle range is greater than or equal to the first angle range, and a keyboard is disposed at the first support member.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

Numerals in drawings: 1—first support member; 2—second support member; 3—third support member; 4—electronic device; 5—first limiter; 6—second limiter; 7—second rotation assembly; 8—first rotation shaft; 9—first connecting member; and 10—slot.

DETAILED DESCRIPTION OF THE EMBODIMENTS

Embodiments of the present disclosure are described in detail below with reference to the accompanying drawings. It will be appreciated that the described embodiments are some rather than all of the embodiments of the present disclosure. Other embodiments obtained by those having ordinary skills in the art on the basis of the described embodiments without inventive efforts should fall within the scope of the present disclosure. In addition, under circumstances of no conflict, the embodiments and the features in the embodiments may be combined with each other.

In the following description, many details are explained in order to fully comprehend the present disclosure. However, the present disclosure can also be implemented in other ways different from those described herein. Those skilled in the art may do so without departing from the scope of the present disclosure. Therefore, the present disclosure is not limited by the embodiments described below.

Unless other defines, the technical and scientific terms used in the specification shall have the usual meanings understood by those with ordinary skills in the art to which this application belongs. The "first," "second," and similar words used in the specification do not denote any order, quantity or importance, but are only used to distinguish different components. "Include," "contain," and other similar words mean that an element or an item appearing before the word covers elements or items listed after the word and the equivalent thereof, but does not exclude other elements or items. "Connected," "attached," and other similar words are limited to physical or mechanical connections, but may include electrical connections directly or indirectly. "Up," "down," "left," and "right", etc. are only used to indicate a relative position relationship. After an absolute position of a described object changes, the relative position relationship may also change accordingly.

To keep the following description of the embodiments of the present disclosure clear and concise, detailed descriptions of known functions and known components are omitted.

In the specification, phrases such as "in one embodiment," "in another embodiment," "in yet another embodiment," or "in other embodiments" all refer to the same or one or more different embodiments according to the present disclosure.

Embodiments of the present disclosure are described in detail below with reference to the accompanying drawings.

Figure 1:
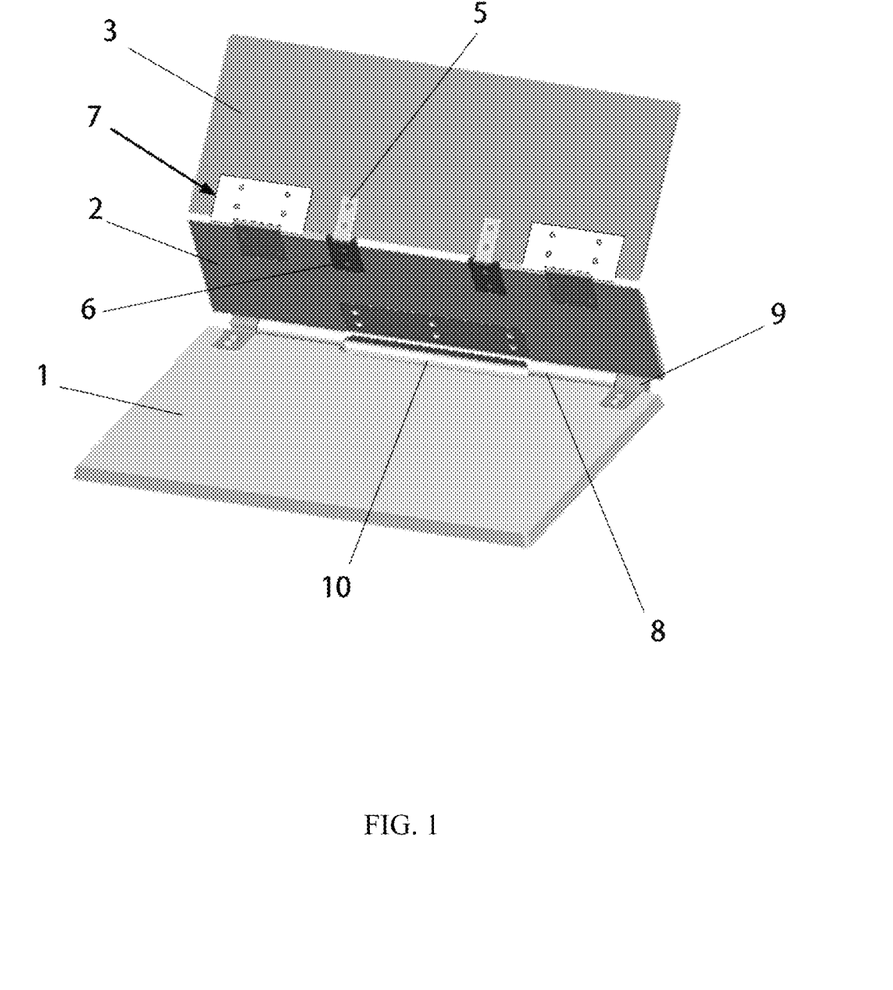
FIG. 1 is a schematic diagram of an exemplary support apparatus according to some embodiments of the present disclosure.

The present disclosure provides a support apparatus. As shown in FIG. 1, the support apparatus includes a first support member 1, a second support member 2, and a third support member 3. The second support member 2 is rotatably connected to the first support member 1 and is capable of rotating in a first angle range starting from a position of the first support member 1. The third support member 3 is rotatably connected to the second support member 2 and is capable of rotating in a second angle range starting from a position of the second support member 2 and continuing along a direction in which the second support member 2 rotates when the second support member 2 rotates to a maximum angle thereof. The second angle range is not smaller than the first angle range.

In some embodiments, the second support member 2 rotates relative to the first support member 1 in an angle range of 0° to 60°. The angle range of 0° to 60° is the first angle range. Based on the first angle range, the second support member 2 rotates to above the first support member 1 and in parallel with the first support member 1, and at the same time, the second support member 2 rotates to a position to form a 60° angle with respect to the first support member 1.

The third support member 3 is rotatably connected to the second support member 2. A rotation range of the third support member 3 includes multiple sections. One of the multiple sections starts from a current position of the second support member 2 (i.e., a maximum angle position). For example, the third support member 3 and the second support member 2 at the maximum angle are coplanar. The third support member 3 starts from a coplanar position and continues to rotate in a same direction that the second support member 2 rotates to a maximum angle in the section of the rotation range of the third support member 3. The section is the second angle range.

Other sections of the rotation range of the third support member 3 may be a rotation range in which the third support member 3 rotates relative to the second support member 2 toward the first support member 1, and a rotation range in which the third support member 3 rotates relative to the second support member 2 while the second support member 2 is rotating to the maximum angle of the second support member 2. In this case, the third support member 3 may only rotate relative to the second support member 2 within the second angle range. For example, the third support member 3 may only start to rotate from the coplanar position with the second support member 2 while the second support member 2 rotates to the maximum angle of the second support member 2, and the third support member 3 may only rotate within the second angle range.

In some embodiments, the second angle range is smaller than or equal to the first angle range. For example, the second angle range may be 0°-60°, 0°-70°, or 0°-80°. By restricting the rotation angle and the rotation direction of the third support member 3, an angle formed between the third support member 3 and the second support member 2 may change in a wider range. For example, the angle formed between the third support member 3 and the second support member 2 in a direction facing away from the first support member 1 may be 0°, an acute angle, a right angle, or an obtuse angle. Thus, when a user uses at least the third support member 3 to support an electronic device 4, the electronic device 4 may have different erection angles relative to the desktop, at which the first support member 1 is located, to satisfy user's various requirements. In some embodiments, the erection angle of the electronic device 4 may be adjusted by changing a height of the electronic device 4 relative to the desktop to ensure that the electronic device 4 is always adjusted to a suitable use angle regardless of user's operation attitudes, thereby improving user's experience of using the electronic device 4. The user no longer needs to hand hold the electronic device 4 or suffers from physical discomfort caused by using the electronic device 4 in a bad attitude for a long time.

In some embodiments, the first support member 1, the second support member 2, and the third support member 3 all are plate-shaped. In some embodiments, they may be rectangular plate-shaped, other shape plate-shaped, or cube-shaped. In some embodiments, different support members may be in different shapes. The first support member 1 may be considered as a base to support the second support member 2 and the third support member 3, and may indirectly support the electronic device 4. In some embodiments, a size of the first support member 1 is a sum of a size of the second support member 2 and a size of the third support member 3. In some other embodiments, the size of the first support member 1 may be greater than or smaller than the sum of the size of the second support member 2 and the size of the third support member 3. The first support member 1 and the third support member 3 are rotatably connected to two opposite sides of the second support member 2, respectively, such that the second support member 2 and the third support member 3 can be coplanar to cover the first support member 1. Thus, an overall shape of the support apparatus resembles a shape of a notebook computer when a cover thereof is closed, as shown in FIG. 2.

In some embodiments, the support apparatus includes, but is not limited to, two basic use shapes. The user may adjust the support apparatus flexibly according to user's needs to place the support apparatus in more and different use shapes.

Figure 5:
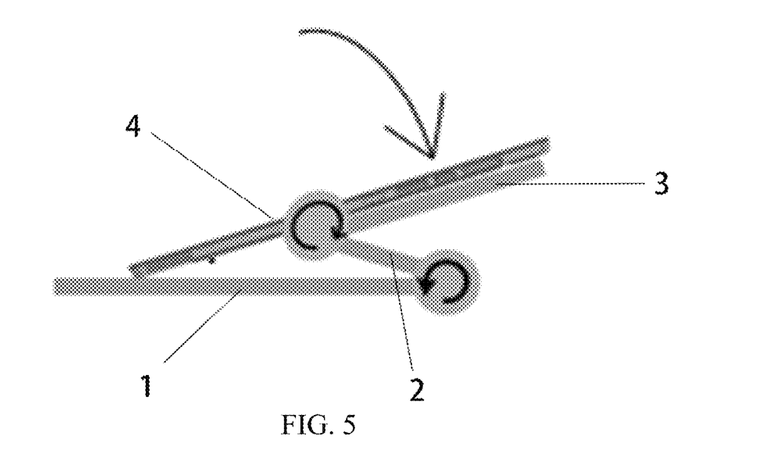
FIG. 5 is a schematic diagram of a first use shape of an exemplary support apparatus according to some embodiments of the present disclosure.

In some embodiments, as shown in FIG. 1 and FIG. 5, the support apparatus is in a first use mode. In the first use mode, the third support member 3 rotates to the maximum angle thereof, the second support member 2 rotates to a first angle. The first angle is an angle within the first angle range.

Figure 2:
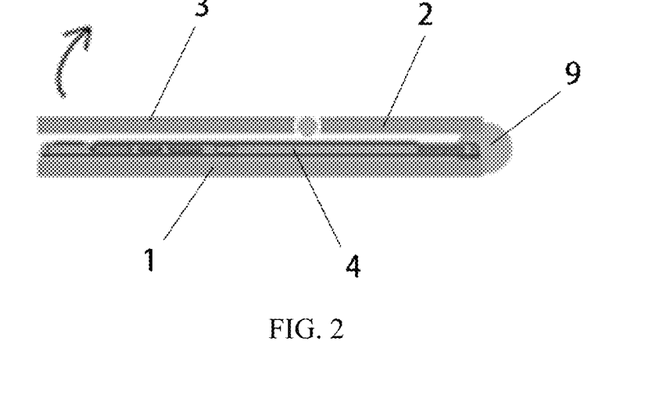
FIG. 2 is a schematic diagram of an exemplary support apparatus in one use state according to some embodiments of the present disclosure.

For example, when the support apparatus is in a state as shown in FIG. 2, and the user pushes the third support member 3 to drive the second support member 2 to rotate to the maximum angle position of the second support member 2, the user may continue to push the third support member 3 in an original direction to rotate the third support member 3 to the maximum angle position of the third support member 3. At the same time, during the rotation of the third support member 3 to the maximum angle position, the second support member 2 is pushed to rotate to approach the first support member 1. The second support member 2 is no longer pushed by the third support member 3 and stops its rotation after the third support member 3 rotates to the maximum angle position of the third support member 3. At this point, an angle formed between the second support member 2 and the first support member 1 is the first angle, and a shape formed by coupling the second support member 2 with the first support member 1 and the third support member 3 is a first use shape.

Figure 4:
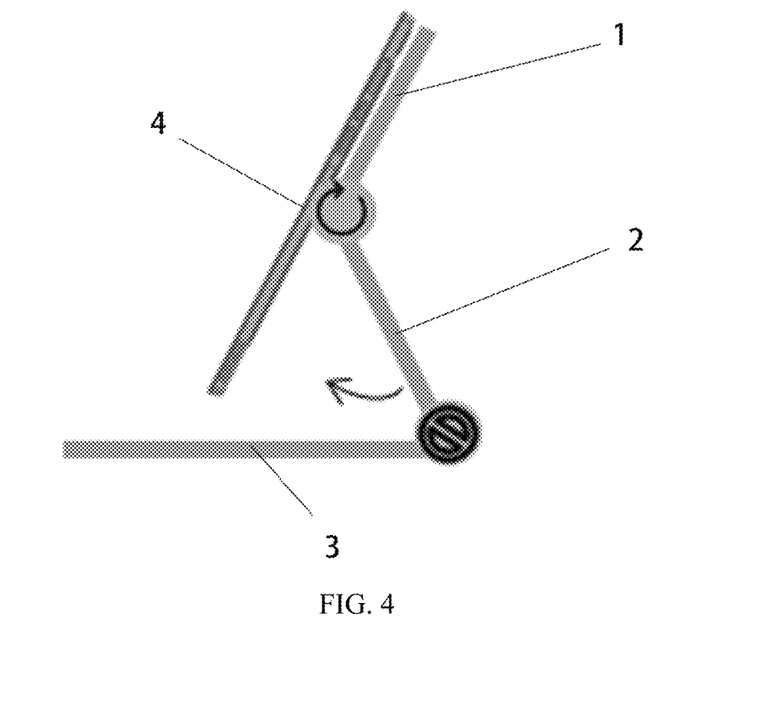
FIG. 4 is a schematic diagram of a second use shape of an exemplary support apparatus according to some embodiments of the present disclosure.

In some embodiments, referring to FIG. 4, the support apparatus is in a second use shape. In the second use shape, the second support member 2 rotates to the maximum angle of the second support member 2, the third support member 3 rotates to a second angle. The second angle is an angle within the second angle range.

Figure 3:
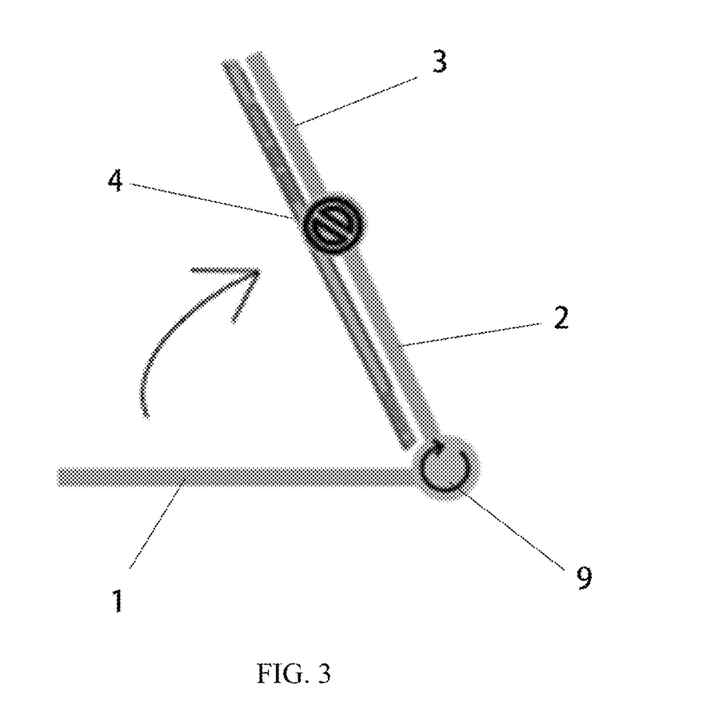
FIG. 3 is a schematic diagram of an exemplary support apparatus in another use state according to some embodiments of the present disclosure.

For example, when the support apparatus is in the state as shown in FIG. 2, and the user pushes the third support member 3 to drive the second support member 2 to rotate to the maximum angle position of the second support member 2, that is, a position shown in FIG. 3, the user may continue to push the third support member 3 in the original direction to rotate the third support member 3 until the third support member 3 is rotated by the second angle, for example, rotated by 30°. At this point, a shape formed by the first support member 1, the second support member 2, and the third support member 3 is the use shape.

In some embodiments, during the rotation of the third support member 3 to the second angle, the second support member 2 always remains at the maximum angle position of the second support member 2. That is, a torsion force of the second support member 2 at this time is greater than a pushing force applied by the third support member 3 on the second support member 2, thereby ensuring that the second support member 2 remains at a same angle position. In some embodiments, the torsion force of the second support member 2 may be smaller than the pushing force applied by the third support member 3 on the second support member 2. In this case, the second support member 2 may rotate by some angle toward the first support member 1 under the pushing force applied by the third support member 3.

In practical applications, a structure for rotatably connecting between the first support member 1 and the second support member 2 may be configured to have a user adjustable torsion force, such that the user may change the torsion force of the second support member 2 according to factors such as a height of the user. Thus, after the user adjusts the second angle position of the third support member 3 based on a shape when the second support member 2 is located at the maximum angle position of the second support member 2, an overall height of the second support member 2 and the third support member 3 satisfies user's requirement.

Further, because the second angle is within the second angle range, the second use shape is practically an intermediate shape when the user drives the support apparatus to form the first use shape. When the user tries to transition the support apparatus from the second use shape to the first use shape, the user only needs to continue to push the third support member 3 to rotate to the maximum angle of the third support member 3. When the user tries to push the support apparatus to transition from the first use shape to the second use shape, the user only needs to pull the third support member 3 in a direction opposite to an original pushing direction, such that the third support member 3 rotates from the maximum angle of the third support member 3 to the second angle, and at the same time, the second support member 2 is driven to rotate from the first angle to the maximum angle of the second support member 2. The above operations are simple and easy for the user to perform.

In some embodiments, referring back to FIG. 3, FIG. 4, and FIG. 5, a side of the third support member 3 facing toward the first support member 1 may be used to abut the electronic deice 4 to support the electronic device 4. To stably support the electronic device 4, a fixing member is disposed at the third support member 3 to fix the electronic device 4. The present disclosure does not limit a structure of the fixing member or a method of fixing the electronic device 4. For example, the fixing member may be a mechanical structure or a magnetic member having a magnetic attraction force as long as the fixing member is able to mount and fix the electronic device 4 to the third support member 3. In some embodiments, the electronic device 4 may be removed from the third support member 3 or may be fixed to the third support member 3 in a different way. For example, a display device may be rotated relative to the third support member 3 to adjust a screen orientation, for example, in a landscape mode or in a portrait mode.

In some embodiments, referring to FIG. 4 and FIG. 5, an angle formed between the second support member 2 and the third support member 3 in the first use shape is smaller than an angle formed between the second support member 2 and the third support member 3 in the second use shape. As such, it is convenient for the user to write on the electronic device 4 supported by the support apparatus being placed in the first use shape. At this point, an angle formed between the electronic device 4 and the desktop where the first support member is located is small. An overall height of the electronic device 4 relative to the user and an inclination of the electronic device 4 relative to the desktop both are optimized for writing in terms of human-factors engineering. The user may write conveniently with a normal hand force. The user may not feel a discomfort occurred in a scenario that the user has to raise arms to write. No obvious physical discomfort will occur to the user even if the user uses the electronic device 4 to write for a long time.

In some embodiments, when the electronic device 4 is supported by the support apparatus being placed in the second use shape, the electronic device 4 is placed in a state convenient for the user to view contents displayed on the electronic device 4. In the second use shape, the second support member 2 is placed at the maximum angle of the second support member 2, and the third support member 3 has a small inclination angle relative to the second support member 2. At this point, being supported and fixed by the third support member 3, a display screen of the electronic device 4 may approximately face toward the user, and the height of the electronic device 4 is equivalent to a height of the user in a sitting position. Thus, it is convenient for the user to view the contents displayed on the electronic device 4, such as watching a video and other displayed contents.

Even if the user is in a standing position, because the electronic device 4 forms a large inclination angle with respect to the desktop where the first support member 1 is located, and the electronic device 4 is tilted upward relative to the desktop, the user is facilitated to view the displayed contents. In addition, when the user wants to use the electronic device 4 for office work, the electronic device 4 being placed in the second use shape also supports the user to perform office work. In some embodiments, the user may rotate the third support member 3 toward a smaller angle direction to make the third support member 3 perpendicular to the first support member 1. Thus, the user may look at the electronic device 4 at an eye level to view the displayed contents more intuitively and more clearly.

In some embodiments, the first angle range is 0°-70°, and the second angle range is 0°-80°. When the third support member 3 rotates to the maximum angle of the third support member 3, that is, in the first use shape, an angle formed between the third support member 3 and the first support member 1 is 150°, and the electronic device 4 is inclined by 30° with respect to the first support member 1. The above-mentioned angles are not fixed, and may be changed according to the actual needs of the user.

In some embodiments, referring to FIG. 1, the support apparatus further includes a first rotation assembly. The first rotation assembly includes a first rotation shaft 8 and a first connecting member 9. The first support member 1 and the second support member 2 are connected to the first rotation shaft 8 and the first connecting member 9, respectively, to achieve a rotatable connection. A stopper structure may be disposed at the first rotation shaft 8 and/or the first connecting member 9 to prevent the first connecting member 9 from continuing to rotate after the second support member 2 rotates to its maximum angle. That is, the stopper structure may be used to limit the second support member 2 to an angle position without continuing to rotate in an angle-increasing direction after the second support member 2 rotates to the maximum angle of the second support member 2. The present disclosure does not limit the specifics of the stopper. For example, a stopper may be disposed at and coupled to both the first rotation shaft 8 and the first connecting member 9. In addition, a slot 10 may be disposed at a side of the first rotation shaft 8 facing toward the first support member 1 for clamping and fixing an electronic pen. For example, a magnetic member may be added to the slot 10 to further assist in fixing the electronic pen.

In some embodiments, the third support member 3 is connected to the second support member 2 through a rotation mechanism. The rotation mechanism includes a limiter assembly. After the third support member 3 rotates to the maximum angle of the third support member 3, the limiter assembly limits the rotation mechanism to prevent the third support member 3 from continuing to rotate in its rotation direction.

For example, as shown in FIG. 1, the limiter assembly includes a first limiter 5 and a second limiter 6 rotatably connected to the first limiter 5. The second support member 2 and the third support member 3 are connected to the first limiter 5 and the second limiter 6, respectively, and are rotatably connected to each other through the first limiter 5 and the second limiter 6. After the third support member 3 rotates to the maximum angle of the third support member 3 in its rotation direction, one end of the first limiter 5 and one end of the second limiter 6 are engaged with each other to limit the third support member 3, and to prevent the third support member 3 from continuing to rotate in its rotation direction.

In practical applications, for example, a hinge that limits a rotation range may be used to form the limiter assembly. In another example, any one of two opposing ends of the first limiter 5 and the second limiter 6 may be extended by a certain extent, such that after the third support member 3 rotates to the maximum angle position of the third support member 3, the two opposing ends of the first limiter 5 and the second limiter 6 are pressed against each other, thereby limiting and preventing the third support member 3 from continuing to rotate.

In addition, the first limiter 5 and the second limiter 6 may also limit the third support member 3 when the third support member 3 rotates to an angle position where the third support member 3 and the second support member 2 are coplanar, and may prevent the third support member 3 from continuing to rotate toward the first support member 1.

In some embodiments, the rotation mechanism further includes a second rotation assembly 7. The second rotation assembly 7 increases the torsion forces of the first support member 1 and the second support member 2 to allow the user to make the third support member 3 stop at any angle within the rotation range of the third support member 3. In some embodiments, the second rotation assembly 7 makes the torsion force of the third support member 3 when the third support member 3 rotates in a direction toward the maximum angle smaller than the torsion force of the third support member 3 when the third support member 3 rotates in a direction opposite to the direction toward the maximum angle. Thus, the third support member 3 is able to stably support the electronic device 4 and will not be rotated toward the first support member 1 by the gravity of the electronic device 4. The second rotation assembly 7 includes a second rotation shaft and a second connecting member. The second support member 2 and the third support member 3 are connected to the second rotation shaft and the second connecting member, respectively, to achieve the rotatable connection between the second support member 2 and the third support member 3.

In some embodiments, a damping structure may be disposed at the second rotation shaft and/or the second connecting member. When the third support member 3 rotates, the torsion force of the third support member 3 gradually changes. After the third support member 3 rotates to the maximum angle of the third support member 3, a damping force between the second rotation shaft and the second connecting member reaches its maximum to assist limiting the third support member 3. In practical applications, the damping structure may be configured to change when the third support member 3 starts to rotate from 0°, or may be configured to change after the third support member 3 rotates by a certain angle.

In some embodiments, the third support member 3 is limited to the maximum angle position after the third support member 3 rotates to the maximum angle of the third support member 3. When the electronic device 4 is partially fixed to the third support member 3, one end of the electronic device 4 facing toward the first support member 1 is located at an outer side of the third support member 3. The user may adjust the support apparatus to the first use shape, such that the end of the electronic device 4 located at the outer side of the third support member 3 is at least located adjacent to the first support member 1 when the user enters data to the electronic device 4 in a writing mode. At this point, because the angle formed between the third support member 3 and the second support member 2 is fixed and the second support member 2 is no longer driven by the third support member 3, the second support member 2 stops its rotation. Thus, in this state, the electronic device 4, the first support member 1, and the second support member 2 are coupled to form a triangle having fixed inner angles. Balanced by stable forces, the triangle provides a stable support for the user's writing operation.

In some embodiments, referring to FIG. 2 through FIG. 5, in actual operations, the user may start from a starting position where the support apparatus is in the state shown in FIG. 2, and may apply a force to the third support member 3 at the position indicated in the drawings to drive the second support member 2 to rotate to the maximum angle of the second support member 2. The second support member 2 remains coplanar with the third support member 3 until the second support member 2 and the third support member 3 rotate to the maximum angle position of the second support member 2, as shown in FIG. 3. At this point, the user continues to push the third support member 3 and the third support member 3 continues to rotate to the second angle to reach the state shown in FIG. 4. This state is the second use shape of the support apparatus.

At this point, the user may continue to push the third support member 3. During the rotation of the third support member 3 to reach the maximum angle position of the third support member 3, the third support member 3 presses the second support member 2, and the second support member 2 rotates in the direction toward the first support member 1 until the third support member 3 rotates to the maximum angle of the third support member 3. At this point, the second support member 2 rotates to the first angle, and the support apparatus is in the second use shape as shown in FIG. 5. When the user wants to retore the support apparatus to its initial position, the user only needs to pull back the third support member 3 until the entire support apparatus resets.

The present disclosure also provides an electronic device. The electronic device includes the above-described support apparatus. A keyboard is disposed at the first support member 1 of the support apparatus. In some embodiments, the keyboard and the first support member 1 are integrally formed. That is, the first support member 1 includes the keyboard. In some other embodiments, the keyboard may be mounted on the first support member 1 in a manner independent of the support apparatus.

In some embodiments, the third support member 3 of the support apparatus includes a display screen. In some embodiments, the display screen and the third support member 3 may be integrally formed. That is, the third support member 3 includes the display screen. In some other embodiments, the display screen may be mounted on the third support member 3 in a manner independent of the support apparatus.

In addition, the second support member 2 may include other electronic components according to user's requirements.

The embodiments of the present disclosure include the following beneficial effects. The support apparatus includes the first support member, the second support member rotatable within the first angle range, and the third support member rotatable within the second angle range which is greater than the first angle range. Thus, the user may adjust the angle of the third support member relative to the first support member within a wide range, such that the electronic device fixed or supported by the third support member facilitates the user with more use angles or use shapes, thereby satisfying the user's requirements for the electronic device.

In the embodiments of the present disclosure, structures of various parts are described in a progressive manner. The description of the structure of each part focuses on the difference from existing structures. The whole and part of the support apparatus and the electronic device may be obtained by combining multiple above-described parts.

In addition, although exemplary embodiments have been described herein, their scope includes any and all implementations with equivalent elements, modifications, omissions, combinations (e.g., cross-over schemes of various embodiments), adaptations, or changes based on the present disclosure. The elements in the claims will be interpreted broadly based on the language adopted in the claims, are not limited to the examples described in the specification or during the implementation of the present disclosure, and the examples will be interpreted as non-exclusive. Therefore, the specification and embodiments are intended to be regarded as examples only, and the true scope and spirit are indicated by the appended claims and the full scope of their equivalents.

The above description is intended to be illustrative and not restrictive. For example, the aforementioned embodiments (one or more solutions) may be combined with each other. Other embodiments may be used by those skilled in the art when reading the specification. In addition, in the aforementioned embodiments, various features may be grouped tother to simplify the description. This should not be construed as an intent that an unclaimed disclosed feature is necessary for any claim. On the contrary, the subject matter of the present disclosure may be less than all the features of the disclosed embodiments. Thus, the appended claims are incorporated into the detailed description as examples or embodiments, where each claim independently serves as a separate embodiment, and it is considered that these embodiments can be combined with each other in various combinations or permutations. The scope of the present disclosure should be determined with reference to the appended claims and the full scope of the equivalents entitled by these claims.

In the specification, specific examples are used to explain the principles and implementations of the present disclosure. The description of the embodiments is intended to assist comprehension of the methods and core ideas of the present disclosure. At the same time, those of ordinary skill in the art may change or modify the specific implementation and the scope of the application according to the embodiments of the present disclosure. Thus, the content of the specification should not be construed as limiting the present disclosure.

What is claimed is:

1. A support apparatus for supporting a flat panel or tablet computer, comprising:
   a first support member;
   a second support member rotatably connected to the first support member and capable of rotating within a first angle range starting from a position where the first support member is located;
   a third support member rotatably connected to the second support member and capable of, after the second support member rotates to a maximum angle thereof, continuing to rotate in a direction in which the second support member rotates within a second angle range starting from a position where the second support member is located; and
   a rotation mechanism connecting the third support member and the second support member, wherein,
      the rotation mechanism including a limiter assembly having a first limiter and a second limiter rotatably connected to the first limiter, the first limiter and the second limiter are attached to and coplanar within the second support member and the third support member, respectively, and the first limiter differs than the second limiter in size or in shape,
      the rotation mechanism further includes two connecting members, one of the connecting members includes a first portion contacting the third support member and a second portion contacting the second support member, and the first and the second limiters are positioned between the two connecting members along a width direction of the support apparatus,
      after the third support member rotates to the maximum angle thereof, the first limiter and the second limiter are engaged with each other to limit the third support member and to prevent the third support member from continuing to rotate in a rotation direction thereof, and
      the second angle range is greater than or equal to the first angle range.

2. The support apparatus according to claim 1, wherein:
   the support apparatus has a first use shape; and
   in the first use shape, the third support member rotates to a maximum angle thereof, and the second support member rotates to a first angle, wherein the first angle is within the first angle range.

3. The support apparatus according to claim 2, wherein:
the support apparatus has a second use shape; and
in the second use shape, the second support member rotates to the maximum angle thereof, and the third support member rotates to a second angle, wherein the second angle is within the second angle range.

4. The support apparatus according to claim 3, wherein:
an electronic device is mounted on a side of the third support member facing toward the first support member; and
an angle formed between the second support member and the third support member in the first use shape is smaller than an angle formed between the second support member and the third support member in the second use shape, such that the electronic device in the first use shape facilitates a user to write on the electronic device and the electronic device in the second use shape facilitates the user to view contents displayed on the electronic device.

5. The support apparatus according to claim 1, wherein:
an electronic device is mounted on a side of the third support member facing toward the first support member;
one end of the electronic device is located at an outer side of the third support member; and
one end of the electronic device in the first use shape is at least located adjacent to the first support member, such that the electronic device, the first support member, and the second support member are coupled to form a triangle having fixed inner angles.

6. The support apparatus according to claim 1, further comprising
a stopper structure to prevent the first connecting member from continuing to rotate after the first connecting member rotates with the second support member and the second support member rotates to the maximum angle of the second support member.

7. The support apparatus according to claim 1, wherein one or both of the first and the second limiters are smaller in width than the first portion or the second portion along the width direction of the support apparatus.

8. The support apparatus according to claim 1, wherein the first portion is larger in width than the second portion along the width direction.

9. The support apparatus according to claim 1, wherein in width along the width direction, the first limiter is smaller than the second limiter, the second limiter is smaller than the second portion, and the second portion is smaller than the first portion.

10. The support apparatus according to claim 1, wherein the first and the second limiters differ in size or shape than the two connecting members.

11. The support apparatus according to claim 1, wherein the rotation mechanism further includes two rotation shafts connected to the second support member, and the two connecting members are connected to the third support member.

12. An electronic device, comprising a support apparatus for supporting a flat panel or tablet computer wherein the support apparatus includes:
a first support member;
a second support member rotatably connected to the first support member and capable of rotating within a first angle range starting from a position where the first support member is located;
a third support member rotatably connected to the second support member and capable of, after the second support member rotates to a maximum angle thereof, continuing to rotate in a direction in which the second support member rotates within a second angle range starting from a position where the second support member is located; and
a rotation mechanism connecting the third support member and the second support member, wherein,
the rotation mechanism including a limiter assembly having a first limiter and a second limiter rotatably connected to the first limiter, the first limiter and the second limiter are attached to and coplanar within the second support member and the third support member, respectively, and the first limiter differs than the second limiter in size or in shape,
the rotation mechanism further includes two connecting members, one of the connecting members includes a first portion contacting the third support member and a second portion contacting the second support member, and the first and the second limiters are positioned between the two connecting members along a width direction of the support apparatus,
after the third support member rotates to the maximum angle thereof, the first limiter and the second limiter are engaged with each other to limit the third support member and to prevent the third support member from continuing to rotate in a rotation direction thereof, and
the second angle range is greater than or equal to the first angle range, and a keyboard is disposed at the first support member.

13. The electronic device according to claim 12, wherein:
the support apparatus has a first use shape; and
in the first use shape, the third support member rotates to a maximum angle thereof, and the second support member rotates to a first angle, wherein the first angle is within the first angle range.

14. The electronic device according to claim 13, wherein:
the support apparatus has a second use shape; and
in the second use shape, the second support member rotates to the maximum angle thereof, and the third support member rotates to a second angle, wherein the second angle is within the second angle range.

15. The electronic device according to claim 14, wherein:
the electronic device is mounted on a side of the third support member facing toward the first support member; and
an angle formed between the second support member and the third support member in the first use shape is smaller than an angle formed between the second support member and the third support member in the second use shape, such that the electronic device in the first use shape facilitates a user to write on the electronic device and the electronic device in the second use shape facilitates the user to view contents displayed on the electronic device.

16. The electronic device according to claim 12, wherein:
the electronic device is mounted on a side of the third support member facing toward the first support member;
one end of the electronic device is located at an outer side of the third support member; and
one end of the electronic device in the first use shape is at least located adjacent to the first support member, such that the electronic device, the first support member, and the second support member are coupled to form a triangle having fixed inner angles.

17. The electronic device according to claim 12, further comprising:
a stopper structure to prevent the first connecting member from continuing to rotate after the first connecting member rotates with the second support member and the second support member rotates to the maximum angle of the second support member.

18. The electronic device according to claim 12, wherein:
the third support member of the support apparatus includes a display screen.

\* \* \* \* \*